United States Patent
Lin et al.

(10) Patent No.: US 6,920,891 B2
(45) Date of Patent: Jul. 26, 2005

(54) EXHAUST ADAPTOR AND METHOD FOR CHAMBER DE-GASSING

(75) Inventors: Mu-Tsang Lin, Changhua (TW); Wie-Liang Tsai, Hsin-Chu (TW); Cherng-Chang Lee, Hsin-Chu (TW); Yen-Chan Lee, Hsin-Chu (TW); Chia-Hsin Liu, Hsinchu (TW)

(73) Assignee: Taiwan Semiconductor Manufacturing Co., Ltd., Hsin Chu (TW)

( * ) Notice: Subject to any disclaimer, the term of this patent is extended or adjusted under 35 U.S.C. 154(b) by 72 days.

(21) Appl. No.: 10/264,519

(22) Filed: Oct. 5, 2002

(65) Prior Publication Data

US 2004/0065366 A1 Apr. 8, 2004

(51) Int. Cl.[7] ............................ F16K 51/00; B08B 9/08
(52) U.S. Cl. .................... 137/15.04; 137/238; 134/1.3; 134/21; 438/905; 156/345.29
(58) Field of Search ........................ 118/715, 723 MV; 134/1.1, 1.2, 1.3, 21, 22.1, 94.1, 95.1, 95.3, 102.1, 171; 137/15.04, 15.05, 238, 240; 156/345.29; 216/63, 67, 69, 74, 75, 77; 438/905, 906

(56) References Cited

U.S. PATENT DOCUMENTS

| | | | | |
|---|---|---|---|---|
| 5,221,424 A | * | 6/1993 | Rhoades ...................... 216/13 |
| 5,770,100 A | * | 6/1998 | Fukuyama et al. .......... 134/1.2 |
| 5,785,796 A | * | 7/1998 | Lee ............................. 134/1.3 |
| 5,926,743 A | * | 7/1999 | Xi et al. ...................... 438/758 |
| 6,022,483 A | * | 2/2000 | Aral ............................. 216/59 |
| 6,047,713 A | * | 4/2000 | Robles et al. ................ 134/1.2 |
| 6,063,198 A | * | 5/2000 | Bang et al. .................. 118/715 |
| 6,197,123 B1 | * | 3/2001 | Poag et al. .................... 134/18 |
| 6,221,168 B1 | * | 4/2001 | Carter et al. ................. 134/1.3 |
| 6,322,714 B1 | * | 11/2001 | Nallan et al. ................. 216/67 |
| 6,613,242 B2 | * | 9/2003 | Nakahara et al. ........... 438/905 |
| 2002/0029788 A1 | * | 3/2002 | Verhaverbeke et al. ...... 134/1.3 |
| 2003/0192570 A1 | * | 10/2003 | Thakur et al. ............... 134/1.3 |

OTHER PUBLICATIONS

Article: Stephen A. Campbell, 14.10 Advanced Silicon Vapor–Phase Epitaxial Growth Techniques; pp. 378–379; $2^{nd}$ ed., 1954.

* cited by examiner

Primary Examiner—Kevin Lee
(74) Attorney, Agent, or Firm—Tung & Associates

(57) ABSTRACT

An exhaust adaptor and method which includes attachment of an exhaust bellow or conduit to a process chamber to facilitate vacuum-induced evacuation of residual toxic gases from the chamber during cleaning and/or maintenance of the chamber. A throttle valve of the chamber is first removed from a throttle valve housing, and one end of the exhaust adaptor is next attached to the throttle valve housing. An exhaust bellow or conduit is attached to the opposite end of the adaptor. As a down flow of air is directed into the open chamber, vacuum pressure is induced in the chamber interior through the exhaust bellow or conduit, the adaptor and the valve housing, respectively. Air disturbances in the chamber interior are thus eliminated, and toxic residual gases generated in the chamber interior are therefore incapable of diffusing to the exterior of the chamber.

19 Claims, 1 Drawing Sheet

EXHAUST ADAPTOR AND METHOD FOR CHAMBER DE-GASSING

FIELD OF THE INVENTION

The present invention relates to process chambers used in the fabrication of integrated circuits on a semiconductor wafer. More particularly, the invention relates to an exhaust adaptor and method for removing residual toxic gases from a process chamber, particularly an etcher, during wet cleaning of the chamber.

BACKGROUND OF THE INVENTION

Integrated circuits are formed on a semiconductor substrate, which is typically composed of silicon. Such formation of integrated circuits involves sequentially forming or depositing multiple electrically conductive and insulative layers in or on the substrate. Etching processes may then be used to form geometric patterns in the layers or vias for electrical contact between the layers. Etching processes include "wet" etching, in which one or more chemical reagents are brought into direct contact with the substrate, and "dry" etching, such as plasma etching.

Various types of plasma etching processes are known in the art, including plasma etching, reactive ion (RI) etching and reactive ion beam etching. In each of these plasma processes, a gas is first introduced into a reaction chamber and then plasma is generated from the gas. This is accomplished by dissociation of the gas into ions, free radicals and electrons by using an RF (radio frequency) generator, which includes one or more electrodes. The electrodes are accelerated in an electric field generated by the electrodes, and the energized electrons strike gas molecules to form additional ions, free radicals and electrons, which strike additional gas molecules, and the plasma eventually becomes self-sustaining. The ions, free radicals and electrons in the plasma react chemically with the layer material on the semiconductor wafer to form residual products which leave the wafer surface and thus, etch the material from the wafer.

Referring to the schematic of FIG. 1, a conventional plasma etch chamber, such as a CENTURA MXP metal etch chamber available from Applied Materials, Inc., of Santa Clara, Calif., is generally indicated by reference numeral 10. The etch chamber 10 includes a housing 12 which defines a housing interior 14. A reaction chamber 18, which receives a wafer substrate (not shown) for etching, is contained in the housing interior 14. Etchant gases 17 are introduced into the housing interior 14 and the reaction chamber 18 through a gas manifold 16. During operation, volatile reaction products and unreacted etchant gases are removed from the reaction chamber 12 and the housing interior 14, as indicated by the arrows, through a throttle valve 22 mounted inside a valve housing 20 and through a gate valve 24, respectively, by operation of a turbo pump 26.

In active semiconductor fabrication process chambers, particularly those in which etching or chemical vapor deposition processes are carried out, residues frequently form on the walls and other surfaces of the chambers during processing. Accordingly, regular periodic wet chamber cleanings between wafer processing cycles is necessary for maintaining optimum system performance in the production of high-quality integrated circuit devices. Such preventative maintenance (PM) chamber cleanings require that the etch chamber lid be opened in order to facilitate physically wiping down the chamber interior.

Wet cleaning of an etch chamber 10 is shown in FIG. 2, wherein facility air down flow 28 is directed into the open etch chamber 10 during the cleaning process. When contacted by cleaning solution, some of the polymer residues which accumulate on the interior surfaces of the housing 12 and the reaction chamber 18 during the previous etching processes form residual gases 30 which diffuse or outgas from the housing 12 and reaction chamber 18 during the wet cleaning operation. For example, after an STI (shallow trench isolation) process is carried out in the etch chamber 10, such outgassing during subsequent wet cleaning includes hydrogen bromide in a time-weighted concentration average of more than 9 ppm in about 10 min. The TLV (threshold limit value) for hydrogen bromide is 3 ppm; thus, maintenance personnel who carry out the wet cleaning process must wear protective gear to minimize or prevent exposure to toxic levels of hydrogen bromide and other residual toxic gases generated during the wet cleaning process. Therefore, while personnel in the immediate vicinity of the etch chamber 10 are protected, the toxic gases tend to diffuse into the surrounding areas of the semiconductor fabrication facility where personnel without protective gear remain exposed to the gases.

According to industrial sanitation and safety standards, if potential toxic substances exist in a workplace, the first priority of health and safety personnel should be to eliminate or control the root causes or sources of such substances. The next priority is to eliminate or reduce toxin transference from the source to the personnel. The last priority is the direct protection of personnel by the use of masks, respirators or other equipment. Because no such method of direct protection is suitable for all situations and is incapable of total protection, however, the most effective prevention methods involve eliminating or controlling the root causes or sources of the toxic substances.

As shown in FIG. 3, a common method of preventing excessive outgassing of toxic gases such as hydrogen bromide during routine chamber wet cleanings involves positioning of a flow hood 32 above the etch chamber 10 and beneath the facility air down flow 28. Accordingly, most of the residual gases 30 from inside the housing 12 and reaction chamber 18 are drawn into the flow hood 32 and are evacuated from the vicinity of the etch chamber 10 through a vacuum line 34 attached to the flow hood 32. While it reduces outgassing of toxic substances, the flow hood 32 is inconvenient to use and tends to hinder access of cleaning and maintenance personnel to the interior of the etch chamber 10. Moreover, the flow hood 32 is incapable of completely preventing outgassing from the etch chamber 10, such that facility personnel remain exposed to some of the toxic fumes of the residual gas, although at reduced concentration. Accordingly, a device is needed for reducing or preventing outgassing of toxic substances such as hydrogen bromide during wet cleaning of a processing chamber.

An object of the present invention is to provide an exhaust adaptor and method for preventing or at least reducing outgassing of residual toxic gases from a process chamber during chamber cleaning or maintenance.

Another object of the present invention is to provide an exhaust adaptor and method which is capable of reducing the concentration of hydrogen bromide and other toxic gases to below occupational safety standards during cleaning or maintenance of a process chamber.

Still another object of the present invention is to provide an exhaust adaptor and method which is capable of reducing the concentration of hydrogen bromide and other toxic gases to as little as zero ppm in the vicinity around a process chamber during cleaning or maintenance of the chamber.

Yet another object of the present invention is to provide an exhaust adaptor and method which prevents injuries and health problems to facility personnel as a result of outgassing of toxic gases such as hydrogen bromide during cleaning or maintenance of a process chamber.

Another object of the present invention is to provide an exhaust adaptor and method which is capable of eliminating the need of facility personnel to wear protective gear during a chamber cleaning or maintenance process.

A still further object of the present invention is to provide an exhaust adaptor and method which facilitates unhindered access of facility personnel to the interior of a process chamber for thorough cleaning or maintenance of the chamber.

Another object of the present invention is to provide an exhaust adaptor and method which reduces or eliminates turbulent flow of air in a process chamber during chamber cleaning or maintenance.

Yet another object of the present invention is to provide an exhaust adaptor which may be connected to an exhaust bellow or conduit for the evacuation of toxic residual gases from a process chamber during cleaning or maintenance of the chamber.

SUMMARY OF THE INVENTION

In accordance with these and other objects and advantages, the present invention is directed to an exhaust adaptor and method which includes attachment of an exhaust bellow or conduit to an outlet of a process chamber such as an etcher to facilitate vacuum-induced evacuation of residual toxic gases from the chamber during cleaning or maintenance of the chamber. According to the method, a throttle valve of the chamber is first removed from a throttle valve housing, and one end of the adaptor is next attached to the throttle valve housing. An exhaust bellow or conduit is attached to the opposite end of the adaptor. As a down flow of air is directed into the open chamber, vacuum pressure is induced in the chamber interior through the exhaust bellow or conduit, the adaptor and the valve housing, respectively. The facility air down flow, combined with the vacuum pressure, facilitates orderly, rather than turbulent, flow of air downwardly through the chamber. Accordingly, toxic gases such as hydrogen bromide generated in the chamber interior during wet cleaning thereof are drawn from the chamber interior and through the valve housing, adaptor and exhaust bellow or conduit, respectively, and eliminated. Air disturbances in the chamber interior are thus eliminated, and the toxic gases are therefore incapable of diffusing to the exterior of the chamber and affecting cleaning personnel and other facility personnel in the vicinity of the chamber.

The vacuum pressure induced in the chamber interior through the adaptor is typically from about −160 mm to about −220 mm Hg, and preferably, about 190 mm/Hg. The air flow rate of the facility down flow is typically from about 0.35 to about 0.45 meters/sec, and preferably, about 0.40 meters/sec. The exhaust adaptor may include a valve nipple which extends from one end of an adaptor housing and engages the throttle valve housing and an exhaust bellow nipple which extends from the opposite end of the adaptor housing and engages the exhaust bellow or conduit.

BRIEF DESCRIPTION OF THE DRAWINGS

The invention will now be described, by way of example, with reference to the accompanying drawings, in which.

DESCRIPTION OF THE PREFERRED EMBODIMENTS

Figure 1:
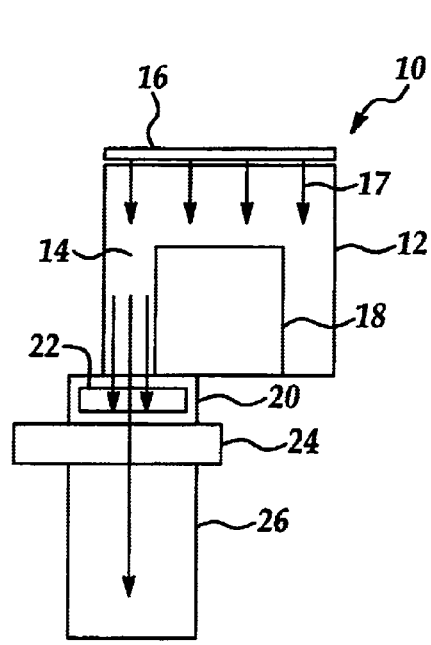
FIG. 1 is a schematic view illustrating operation of a conventional process chamber such as an etcher.
Figure 2:
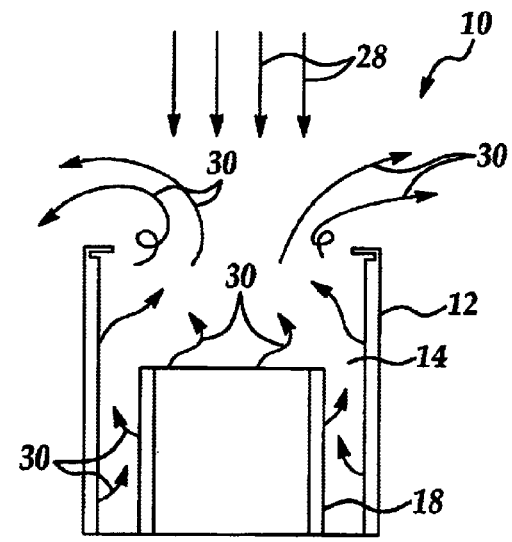
FIG. 2 is a schematic view illustrating air flow during wet cleaning of a conventional process chamber.
Figure 3:
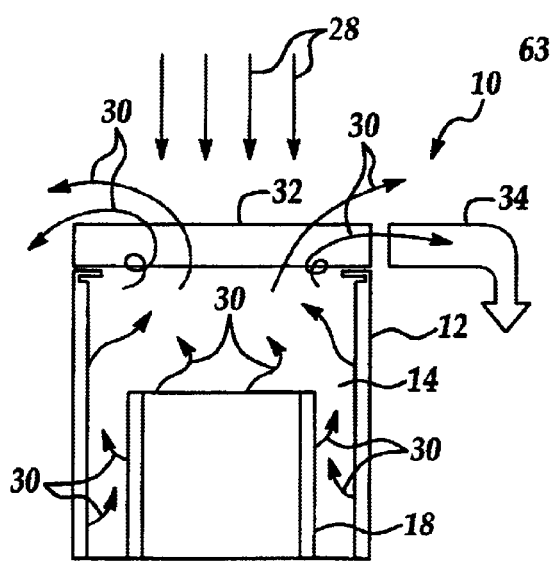
FIG. 3 is a schematic view illustrating air flow during wet cleaning of a conventional process chamber using a flow hood.
Figure 4:
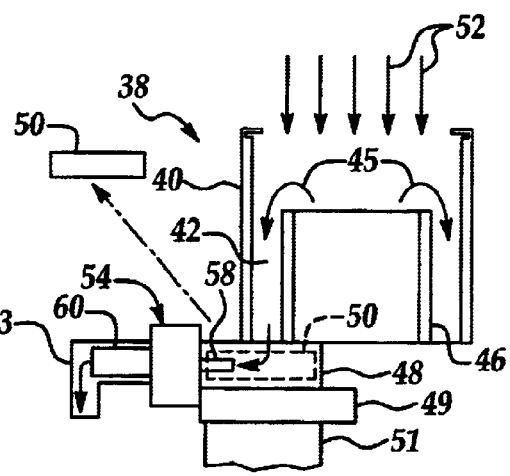
FIG. 4 is a schematic view of a process chamber, illustrating evacuation of toxic gases from the chamber during a wet cleaning process in implementation of the present invention.
Figure 5:
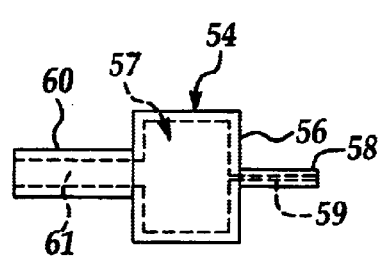
FIG. 5 is a side view, partially schematic, of an exhaust adaptor of the present invention.

Referring to FIGS. 4 and 5, the present invention is suitable for reducing or preventing outgassing of toxic residual gases such as hydrogen bromide from a process chamber 38 during routine cleaning or maintenance of the process chamber 38. The process chamber 38 may be a conventional plasma etch chamber, such as a CENTURA MXP metal etch chamber available from Applied Materials, Inc., of Santa Clara, Calif. However, it is understood that the present invention may be equally applicable to other types of process chambers used in the fabrication of semiconductor integrated circuits.

The process chamber 38 may be a conventional metal etch chamber which includes a chamber housing 40 that defines a chamber housing interior 42. A lid (not shown) fits on the upper end of the chamber housing 40 and closes the chamber housing interior 42 during operation of the process chamber 38. A reaction chamber 46 is provided inside the chamber housing interior 42 and receives a wafer substrate (not shown) typically for the etching of conductive layers thereon, such as in a shallow trench isolation (STI) process, for example. A throttle valve housing 48, which normally houses a throttle valve 50, is provided typically on the bottom of the chamber housing 40 in fluid communication with the chamber housing interior 42. A gate valve 49 is typically disposed between the throttle valve housing 48 and a turbo pump 51 for the removal of exhaust gases from the chamber housing interior 42 through the throttle valve 50, the gate valve 49 and the turbo pump 51, respectively, during operation of the process chamber 38, in conventional fashion.

Referring next to FIG. 5, an illustrative embodiment of an exhaust adaptor 54 which is suitable for implementation of the present invention is shown. The exhaust adaptor 54 may include an adaptor housing 56 having a housing interior 57. A valve nipple 58, through which extends a valve nipple bore 59 that is disposed in fluid communication with the housing interior 57, extends from one side of the adaptor housing 56. An exhaust bellow nipple 60, through which extends an exhaust nipple bore 61 that is disposed in fluid communication with the housing interior 57, extends from the opposite side of the adaptor housing 56. It is understood that the exhaust adaptor 54 may have alternative designs, other than that heretofore described with respect to FIG. 5, consistent with the use requirements of the present invention, as hereinafter described.

After repeated use of the process chamber 38, polymer residues and other impurities (not shown) tend to accumulate on those surfaces of the chamber housing 40 and the reaction chamber 46 previously exposed to the process gases introduced into the chamber housing interior 42. Accordingly, the process chamber 38 is periodically subjected to routine maintenance and cleaning to remove these residues in order to prevent particle contamination of wafer substrates (not shown) subsequently processed in the reaction chamber 46. According to a preferred method of the present invention, in preparation for routine maintenance and/or cleaning, the process chamber 38 is initially thoroughly vented by operation of the turbo pump 51, such that most of the residual process gases 45 remaining in the chamber housing interior 42 and reaction chamber 46 are evacuated from the chamber housing interior 42 and reaction chamber 46 through the throttle valve 50, the gate valve 49 and the turbo pump 51, respectively. Next, the turbo pump 51 is turned off and the gate valve 49 is closed. The throttle valve 50 is then removed from the throttle valve housing 48, according to the knowledge of those skilled in the art and as indicated in FIG. 4. The exhaust adaptor 54 is next mounted in fluid communication with the exposed opening (not shown) of the throttle valve housing 48, through which opening the throttle valve 50 was removed, typically by inserting the valve nipple 58 of the exhaust adaptor 54 into the throttle valve housing 48. Next, the exhaust bellow 63 is confluently attached to the exhaust adaptor 54, typically by inserting the exhaust bellow nipple 60 of the exhaust adaptor 54 into the open end of the exhaust bellow 63. The exhaust adaptor 54 may be coupled in fluid-tight connection to the throttle valve housing 48 and the exhaust bellow 63 according to techniques which are known by those skilled in the art. Finally, the fabrication facility air down flow 52 is directed downwardly onto the process chamber 38, typically at an air flow rate of about 0.35 to about 0.45 meters/sec, and preferably, about 0.40 meters/sec. Simultaneously, a vacuum pressure, typically about −160 mm to about −220 mm Hg, and preferably, about 190 mm/Hg, is induced in the chamber housing interior 42 through the exhaust bellow 63, the exhaust adaptor 54 and the throttle valve housing 48, respectively, and the chamber lid (not shown) is removed from the chamber housing 40.

As shown in FIG. 4, the air down flow 52, in combination with the vacuum pressure induced in the chamber housing interior 42, facilitates non-turbulent flow of air through the process chamber 38. Thus, residual process gases 45 generated in the chamber housing interior 42 and reaction chamber 46 as a result of the cleaning process flow directly from those elements through the throttle valve 50, the exhaust adaptor 54 and the exhaust bellows 63, respectively, and are disposed of in a conventional manner. Accordingly, facility personnel are capable of unhindered access to the chamber housing interior 42 and the reaction chamber 46 during cleaning or other maintenance of the process chamber 38 while the residual and potentially toxic process gases 45, such as hydrogen bromide, in particular, are incapable of rising in the chamber housing interior 42 and escaping from the process chamber 38 into the environment surrounding the process chamber 38.

After the process chamber 38 is cleaned in the manner heretofore described, the exhaust adaptor 54 is disconnected from the throttle valve housing 48 and the throttle valve 50 is replaced in the throttle valve housing 48, according to the knowledge of those skilled in the art, for continued operation of the process chamber 38.

A series of experiments was performed to determine the concentration of HBr in the area surrounding the process chamber during routine chamber wet cleaning using the method of the present invention, as compared to the HBr concentration using a conventional flow hood and using no de-gassing method or equipment, respectively, during wet cleaning. Using an F8 ISEP, TLD HBr detector spaced at a distance of 20 cm. from the process chamber, with a facility air down flow rate of 0.4+/−0.05 M/S and a vacuum pressure of −190+/−30 mm/Hg, it was found that evacuation of residual process gases in accordance with the method of the present invention completely eliminates HBr concentration to 0 ppm. In contrast, use of a conventional flow hood resulted in HBr concentrations of as high as 9 ppm at 20 cm. from the process chamber, as did use of no flow hood or other de-gassing mechanism, during chamber cleaning.

While the preferred embodiments of the invention have been described above, it will be recognized and understood that various modifications can be made in the invention and the appended claims are intended to cover all such modifications which fall within the spirit and scope of the invention.

What is claimed is:

1. A method of removing gases from a chamber, comprising the steps of:

providing an air down flow into said chamber;

providing an exhaust bellow and an exhaust adaptor and providing said exhaust adaptor in fluid communication with said exhaust bellow and said chamber; and applying a vacuum pressure to said chamber whereby said gases pass from said chamber via said exhaust bellow into a vacuum source that applies said vacuum pressure.

2. The method of claim 1 wherein said vacuum pressure is from about 160 mm/Hg to about 220 mm/Hg.

3. The method of claim 1 wherein said air down flow comprises an air flow rate of from about 0.35 meters/sec. to about 0.45 meters/sec.

4. The method of claim 3 wherein said vacuum pressure is from about 1.60 mm/Hg to about 220 mm/Hg.

5. The method of claim 1 wherein said vacuum pressure is from about 160 mm/Hg to about 220 mm/Hg.

6. The method of claim 1 wherein said air down flow comprises an air flow rate of from about 0.35 meters/sec. to about 0.45 meters/sec.

7. The method of claim 6 wherein said vacuum pressure is from about 160 mm/Hg to about 220 mm/Hg.

8. The method of claim 1 wherein said exhaust adaptor comprises an adaptor housing, a first nipple provided in fluid communication with said adaptor housing for confluent attachment to said chamber and a second nipple provided in fluid communication with said adaptor housing for confluent attachment to said exhaust bellow.

9. The method of claim 8 wherein said vacuum pressure is from about 160 mm/Hg to about 220 mm/Hg.

10. The method of claim 8 wherein said air down flow comprises an air flow rate oil from about 0.35 meters/sec. to about 0.45 meters/sec.

11. The method of claim 10 wherein said vacuum pressure is from about 160 mm/Hg to about 220 mm/Hg.

12. A method of removing gases from a chamber having a throttle valve housing containing a removable throttle valve, said method comprising the steps of:

venting said chamber;

removing said throttle valve from said throttle valve housing;

providing an exhaust adaptor;

providing an exhaust bellow;

confluently attaching said exhaust adaptor to said throttle valve housing and said exhaust bellow;

providing an air down flow into said chamber; and applying a vacuum pressure to said chamber through said exhaust bellow whereby said gases pass from said chamber via said exhaust bellow into a vacuum source that applies said vacuum pressure.

13. The method of claim 12 wherein said vacuum pressure is from about 160 mm/Hg to about 220 mm/Hg.

14. The method of claim 12 wherein said air down flow comprises an air flow rate of from about 0.35 meters/sec. to about 0.45 meters/sec.

15. The method of claim 14 wherein said vacuum pressure is from about 160 mm/Hg to about 220 mm/Hg.

16. The method of claim 12 wherein said exhaust adaptor comprises an adaptor housing, a first nipple provided in fluid communication with said adaptor housing for confluent attachment to said throttle valve housing and a second nipple provided in fluid communication with said adaptor housing for confluent attachment to said exhaust bellow.

17. The method of claim 16 wherein said vacuum pressure is from about 160 mm/Hg to about 220 mm/Hg.

18. The method of claim 16 wherein said air down flow comprises an air flow rate of from about 0.35 meters/sec. to about 0.45 meters/sec.

19. An exhaust adaptor for connecting an exhaust bellow in fluid communication with a throttle valve housing of a process chamber, comprising:

an adaptor housing;

a first nipple provided in fluid communication with said adaptor housing for confluent attachment to the throttle valve housing; and a second nipple provided in fluid communication with said adaptor housing for confluent attachment to the exhaust bellow.

* * * * *